(12) United States Patent
Kuo

(10) Patent No.: US 9,574,632 B2
(45) Date of Patent: Feb. 21, 2017

(54) SELF-COOLING BRAKE DISC ASSEMBLY

(71) Applicant: CHIA CHERNE INDUSTRY CO., LTD., Changhua County (TW)

(72) Inventor: Yung-Pin Kuo, Changhua County (TW)

(73) Assignee: CHIA CHERNE INDUSTRY CO., LTD., Changhua (TW)

( * ) Notice: Subject to any disclaimer, the term of this patent is extended or adjusted under 35 U.S.C. 154(b) by 209 days.

(21) Appl. No.: 14/529,148

(22) Filed: Oct. 31, 2014

(65) Prior Publication Data
US 2015/0144441 A1  May 28, 2015

(30) Foreign Application Priority Data

Nov. 22, 2013 (TW) .............................. 102221969 U

(51) Int. Cl.
*F16D 65/12* (2006.01)
*F16D 65/847* (2006.01)

(52) U.S. Cl.
CPC ........... *F16D 65/847* (2013.01); *F16D 65/123* (2013.01); *F16D 65/128* (2013.01)

(58) Field of Classification Search
CPC ............... B21L 1/005; B21L 6065/123; B21L 6065/125; B21L 6065/128; B21L 6065/847; F16D 65/123; F16D 65/125; F16D 65/128; F16D 65/847; F16D 2065/1384; F16D 2055/0004; F16D 2065/132; F16D 2065/1316; F16D 2065/1332; F16D 2200/003; F16D 2200/0017

USPC .................. 188/18 A, 218 R, 18 XL, 264 R, 264 A, 188/264 AA, 24.11–24.13
See application file for complete search history.

(56) References Cited

U.S. PATENT DOCUMENTS

| | | | | |
|---|---|---|---|---|
| 4,674,606 | A | * | 6/1987 | Denton ................... F16D 65/10 188/264 R |
| 6,880,683 | B1 | * | 4/2005 | Miles .................... F16D 65/128 188/218 XL |
| 9,267,560 | B2 | * | 2/2016 | Nakakura ............... F16D 65/12 |
| 2010/0258394 | A1 | * | 10/2010 | Hanna ..................... F16D 65/12 188/264 A |
| 2011/0240420 | A1 | * | 10/2011 | Souwa .................... F16D 65/12 188/218 XL |
| 2012/0000736 | A1 | | 1/2012 | Koshiyama |
| 2013/0092485 | A1 | * | 4/2013 | Moore .................... F16D 65/12 188/218 XL |
| 2013/0168193 | A1 | * | 7/2013 | Iwai ....................... F16D 65/12 188/218 XL |

* cited by examiner

*Primary Examiner* — William Gilbert
(74) *Attorney, Agent, or Firm* — Guice Patents PLLC

(57) ABSTRACT

A brake disc assembly includes a hub member, a rotor member and a plurality of air guide plates. The hub member is provided to be connected to a wheel hub. The rotor member includes an annular portion and a plurality of support limbs that protrude radially inward from an inner peripheral face of the annular portion and are joined to a periphery of the hub member by bolts. The air guide plates are disposed in a circumferential direction about a central axis of the hub member. Each of the air guide plates substantially interposed in a gap between adjacent two of the support limbs of the rotor member.

9 Claims, 8 Drawing Sheets

SELF-COOLING BRAKE DISC ASSEMBLY

BACKGROUND OF THE INVENTION

1. Field of the Invention

The present invention relates to a brake disc assembly, and more particularly to a self-cooling brake disc assembly.

2. Description of the Related Art

Vehicle brake systems often include brake rotors that are subject to frictional forces in order to slow or stop the associated vehicle. During the braking of vehicles, kinetic energy is converted into heat via the braking system. The corresponding heat should be conducted from the point of its formation as efficiently as possible, since an increase in temperature of brake systems lead in most cases to a decrease of the friction coefficient.

One type of brake disc (or rotor) is illustrated in U.S. Pat. Application No. 2012/0000736. In this brake disc, a cooling member, which is disc-shaped and made of a metal material, is attached to a rotor member for heat transfer from the rotor member to the cooling member. In order to allow the heat to be quick dissipated via convection (and radiation) from the cooling member to the surrounding air, the cooling member is generally large and heavy, causing an increase of cost and a decrease of the efficiency for the brake system.

SUMMARY OF THE INVENTION

Accordingly, it is an object of the present invention to provide a new type of self-cooling brake disc assembly to solve the aforementioned problem. The brake disc assembly includes a hub member, a rotor member and a plurality of air guide plates. The hub is provided to be connected to a wheel hub. The rotor member includes an annular portion and a plurality of support limbs that protrude radially inward from an inner peripheral face of the annular portion. The support limbs are joined to a periphery of the hub member by fasteners. The air guide plates are disposed in a circumferential direction about a central axis of the hub member. Each of the air guide plates is substantially interposed in a gap between adjacent two of the support limbs of the rotor member. Specifically, each of the air guide plates has at least one opening and at least one air deflector disposed proximate the opening to cause airflow to go around the rotor member. The air deflector of each of the air guide plates may have a curved or angulated directing surface that alters a course of air encountering the directing surface such that all the air deflectors together direct the airflow generally in a circumferential direction.

More specifically, the at least one opening of each of the air guide plates includes a first opening and a second opening, and the at least one air deflector of each of the air guide plates includes a first air deflector and a second air deflector that are located proximate the respective first and second openings. The first air deflector is located on a left side of the associated air guide plate to cause the airflow to pass through the first opening from a right side of the air guide plate to the left side. The second air deflector is located on the right side of the air guide plate proximate the second opening to cause the airflow to pass through the second opening from the left side to the right side.

These and other features and advantages of the present invention will become apparent to those skilled in the art upon a reading of the following detailed description when taken in conjunction with the drawings wherein there is shown and described an illustrative embodiment of the invention.

DETAILED DESCRIPTION OF EMBODIMENTS

Figure 1:
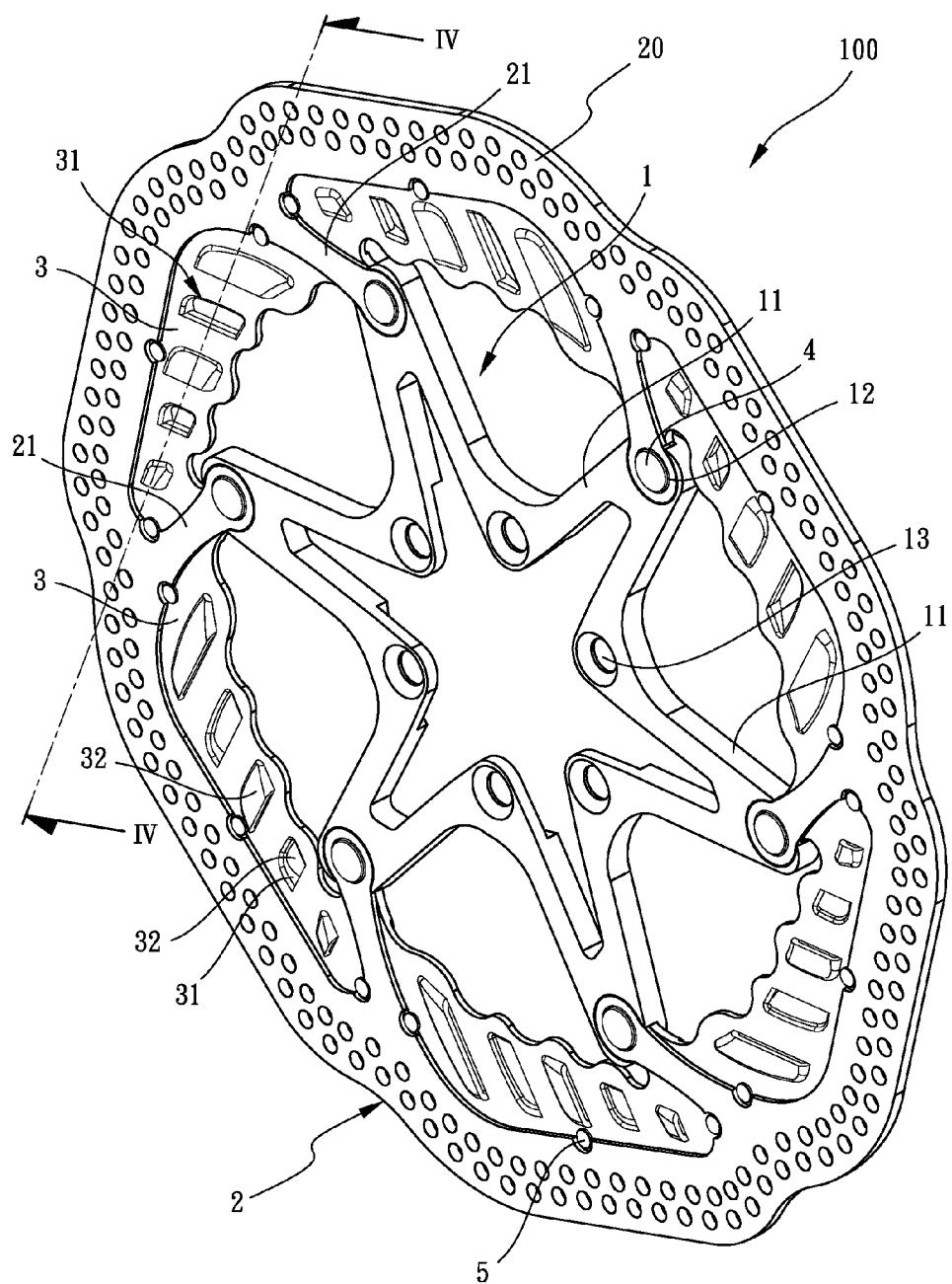
FIG. 1 is a perspective view of a brake disc assembly in accordance with a first embodiment of the present invention.

Referring to FIG. 1, there is shown a first embodiment of the brake disc assembly 100 according to the invention, the assembly 100 including a hub member 1, a rotor member 2 and a plurality of air guide plates 3.

Figure 5:
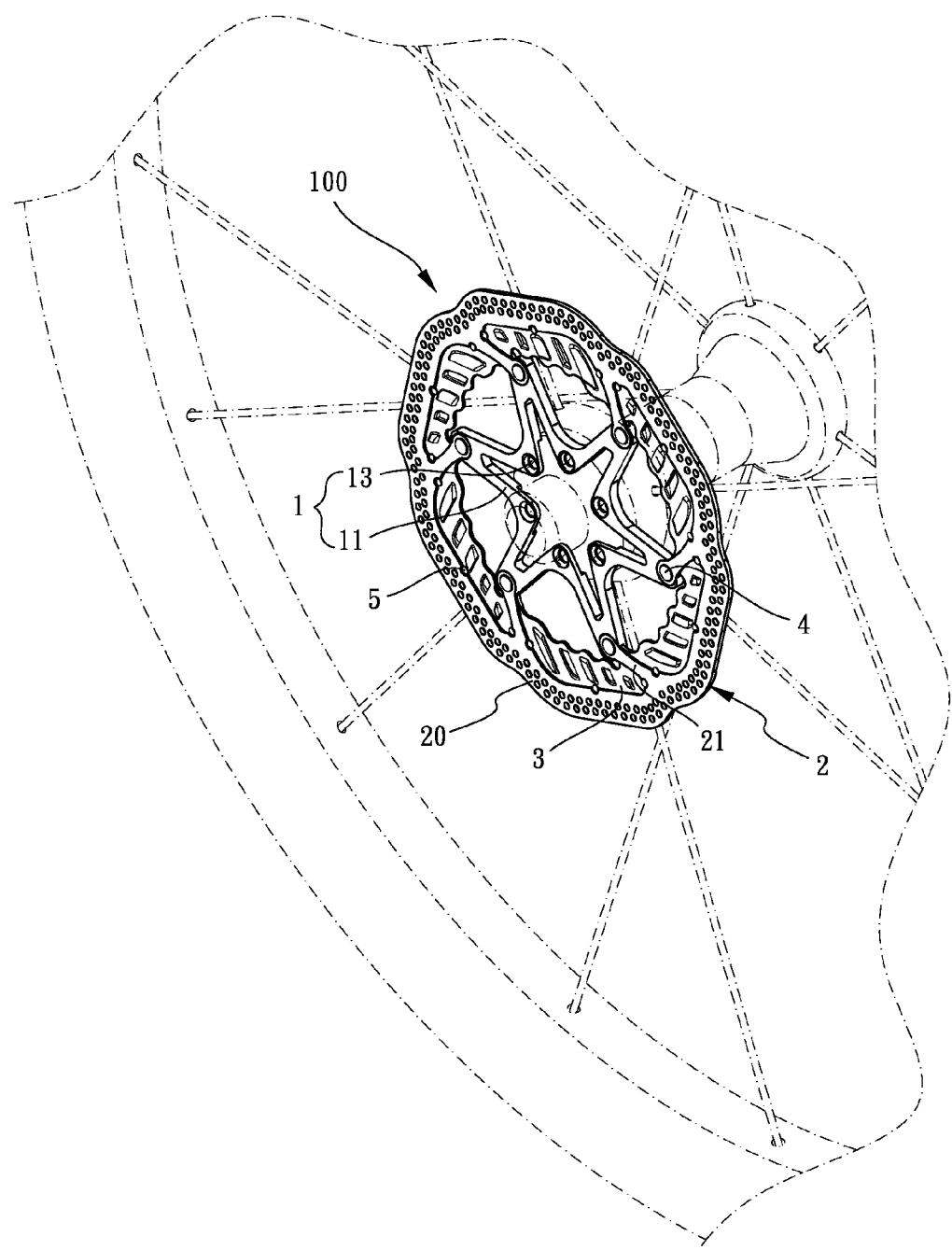
FIG. 5 is another perspective view of the brake disc assembly in conjunction with a wheel hub (shown in dotted lines)

The hub member 1, shaped like a star, includes a plurality of arm sections 11 extending radially outwardly. A plurality of circumferentially spaced inner holes 13 are defined in an inner portion of the hub member 11 about a central axis of the hub member for connection to a wheel hub by bolts. Thus, as shown in FIG. 5, the brake disc assembly 100 is to be mounted onto the wheel hub (shown in dotted lines) with the hub member 1. On the other hand, the hub member 1 includes a plurality of circumferentially spaced outer holes 12 respectively defined in distal ends of the arm sections 11 and dimensioned to receive fasteners 4 for connection with the rotor member 2 as well as the air guide plates 3.

Figure 2:
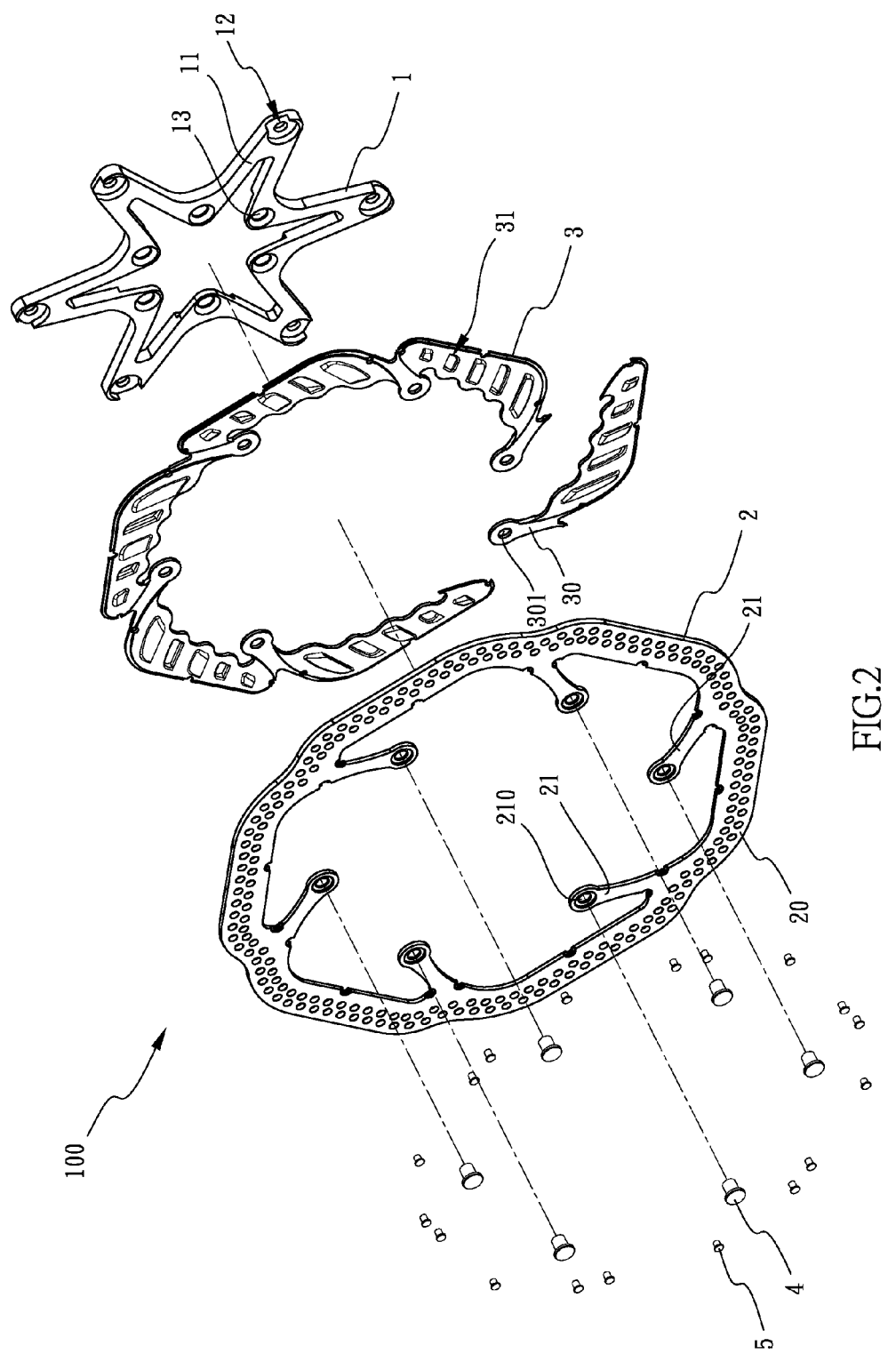
FIG. 2 is an exploded perspective view of the brake disc assembly shown in FIG. 1.

As shown in FIG. 2, the rotor member 2 includes an annular portion 20 and a plurality of support limbs 21 that protrude radially inward from an inner peripheral face of the annular portion 20 and are joined to a periphery of the hub member, namely the arm sections 11 via the fasteners 4. The air guide plates 3 are disposed in a circumferential direction about the central axis of the hub member 1. And each of the air guide plates 3 is substantially interposed in a gap (not numbered) between adjacent two of the support limbs 21 of the rotor member 2, as best seen in FIG. 1.

Referring again to FIG. 2, each of the support limbs 21 of the rotor member 2 has at its free end a hole 210 corresponding to the outer hole 12 in the associated arm section 11 of the hub member 1. Each of the air guide plates 3 has a leg 30 extending in a direction along an associated one of the support limbs 21 of the rotor member 2. Similar to the support limb 21, the leg 30 defines a bore 301 corresponding to the hole 210 in the associated support limb 21. Each of the fasteners 4 passes through the hole 210 in the respective support limb 21 of the rotor member 2, the bore 301 in the leg 30 of the respective air guide plate 3 as well as the respective outer hole 12 in the arm section 11 of the hub member 1 such that the hub member 1, the rotor member 2 and the air guide plates 3 may be secured together.

Figure 3:
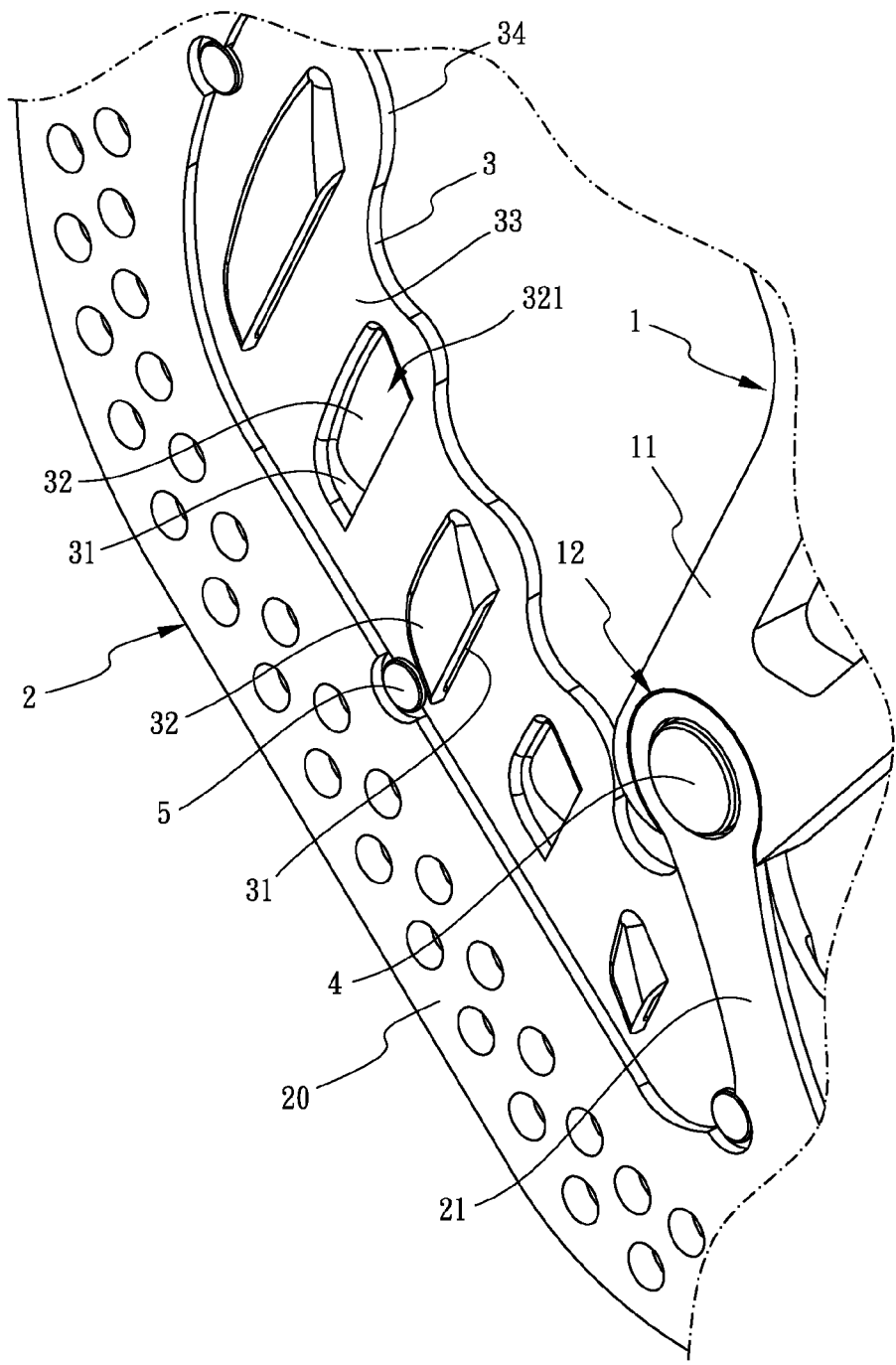
FIG. 3 is a partial enlarged cross-sectional view of the brake disc assembly shown in FIG. 1.
Figure 4:
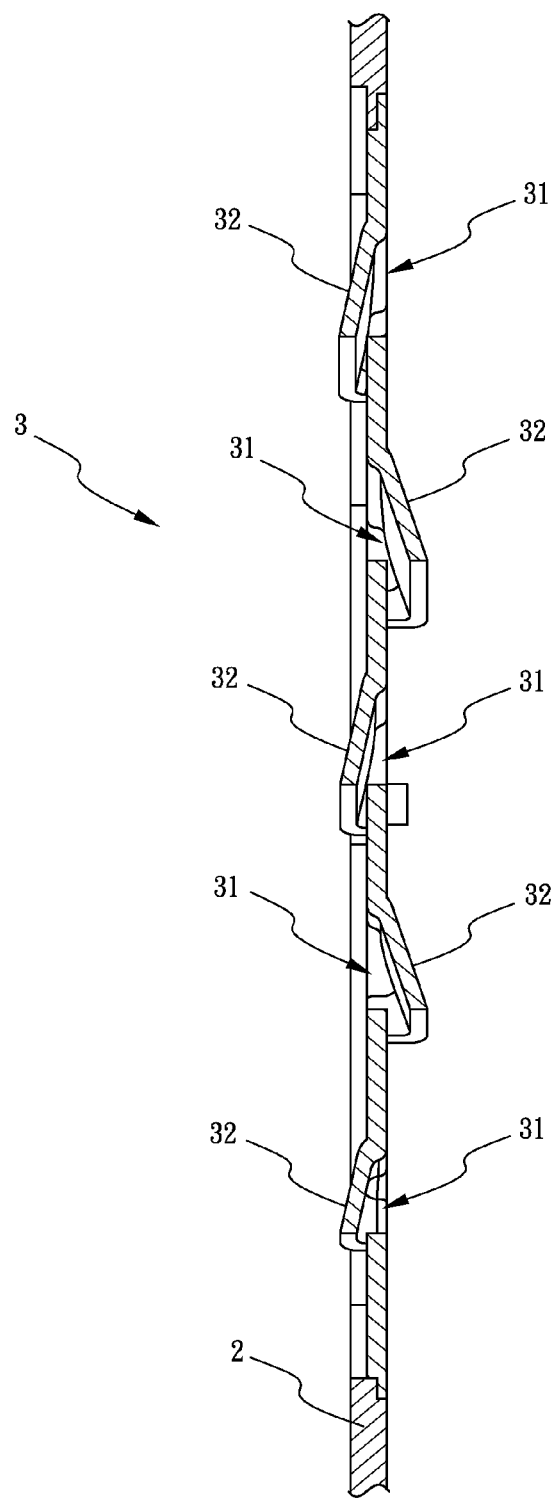
FIG. 4 is a cross-sectional view of the brake disc assembly taken along the line IV-IV in FIG. 1.

It will be appreciated that at least one rivet 5 may be employed and disposed at a junction between each support limb 21 of the rotor member 2 and the associated air guide plate 3, as shown in FIG. 1 or 3 for laterally positioning the air guide plate 3 within the gap between the adjacent two of the support limbs 21 of the rotor member 2.

As best seen in FIG. 3, each of the air guide plates 3 has at least one opening 31 and at least one air deflector 32 disposed proximate the opening 31 to cause airflow to go around the rotor member 2. In the illustrated embodiment, there are five openings 31 arranged in a row in each of the air guide plates 3 and five air deflectors 32 respectively disposed proximate the five openings 31. Specifically, each of the air deflectors 32 has a curved or angulated directing surface 321 that alters a course of air encountering the directing surface 321 such that all the air deflectors 32 together direct the airflow generally in the circumferential direction. Preferably, the openings 31 in the air guide plate 3 have different sizes. As depicted in FIG. 3, the relatively lower second opening 31 is sized smaller than the upper first opening 31. The relatively lower third opening 31 is sized smaller than the upper second opening 31, and so on. Besides, the air deflectors 32 are dimensioned and sized in accordance with the respective openings 31 in the air guide plate 3. That is, the uppermost first air deflector 32 is the biggest while the lowest fifth air deflector 32 is the smallest. This helps to create a relatively more stable airflow about the rotor member 2 to enhance heat dissipation.

In particular, the air deflectors 32 are alternately located on opposite sides of each air guide plate 3. For example, as shown in FIG. 3, the first, third and fifth air deflectors 32 (counted from top to bottom) are located on the left side of the air guide plate 3, while the second and fourth air deflectors 32 are located on the right side or the other side. In this manner, the first set of the air deflectors 32 cause the airflow to pass through the associated openings 31 from the right side of the air guide plate 3 to the left side. And the second set of the air deflectors 32 cause the airflow to pass through the associated openings 31 from the left side to the right side. Thus, the heat generated from both sides of the rotor member 2 may both be well dissipated. Nevertheless, all the air deflectors 32 are arranged in a manner to direct the airflow in the circumferential direction.

Figure 6:
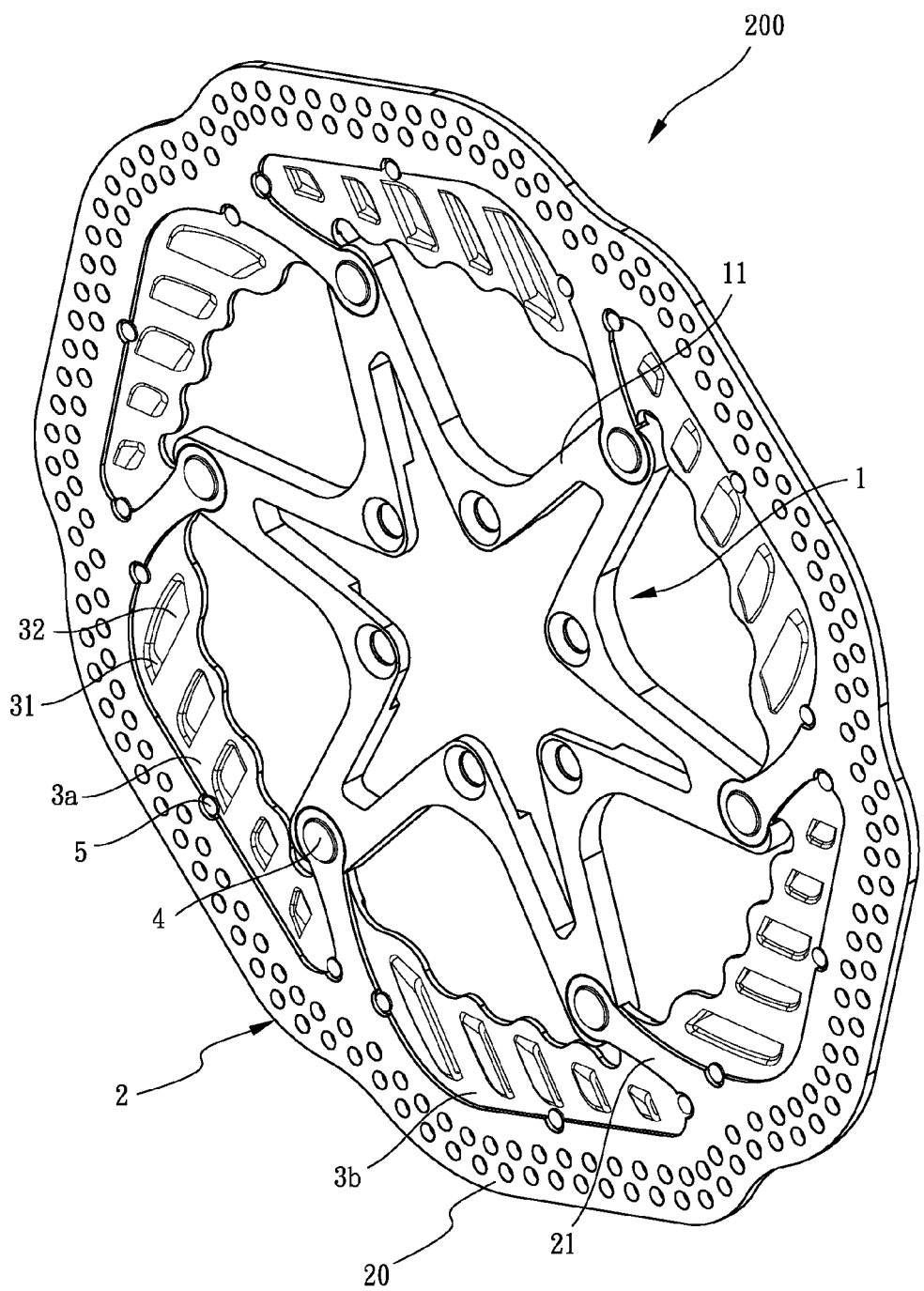
FIG. 6 is a perspective view of a brake disc assembly in accordance with a second embodiment of the present invention.

Referring now to FIG. 6, there is shown a second embodiment 200. Embodiment 200 is similar to embodiment 100, except that air guide plates 3a, 3b are provided in lieu of the aforementioned air guide plates 3. Specifically, the air guide plate 3a has its first and second air deflectors 32 located on the left side thereof while the air guide plate 3b has its first and second air deflectors 32 located on the right side thereof.

Figure 7:
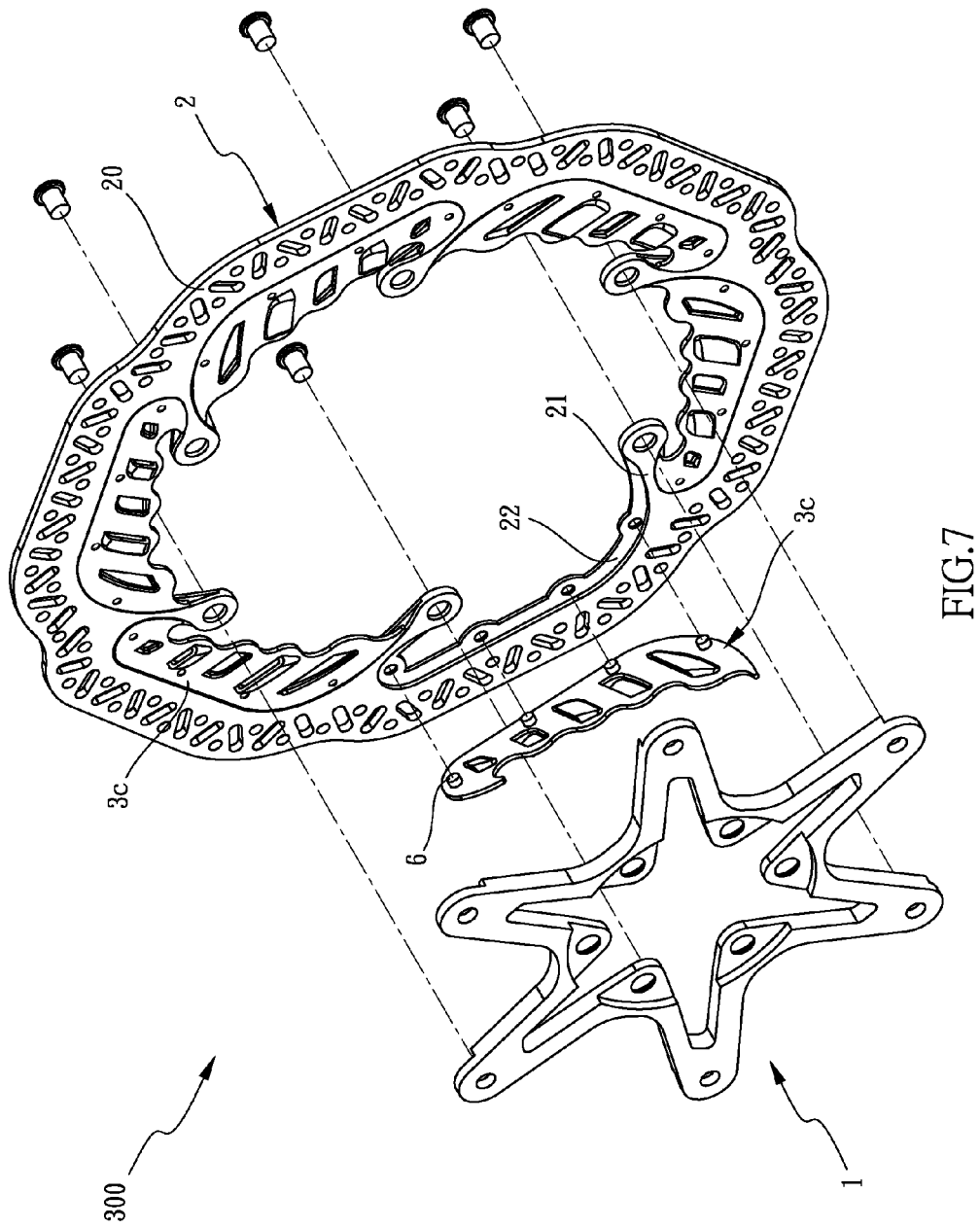
FIG. 7 is an exploded perspective view of a brake disc assembly in accordance with a third embodiment of the present invention.
Figure 8:
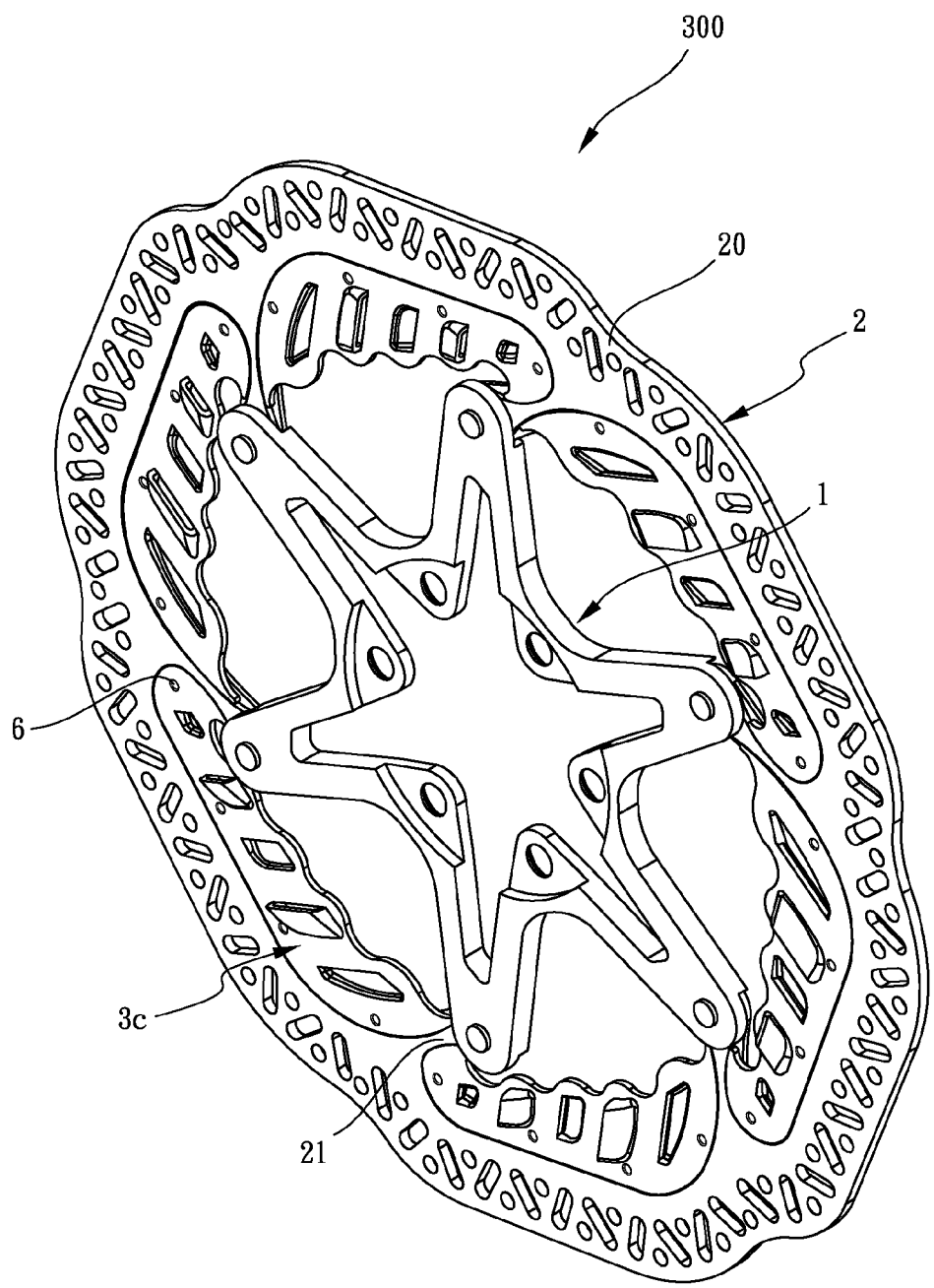
FIG. 8 is a perspective view of the brake disc assembly of FIG. 7.

With respective to FIGS. 7 and 8, there is shown a third embodiment 300. Embodiment 300 is substantially similar to embodiment 100, except that the air guide plates 3c are provided in lieu of the aforementioned air guide plates 3. Briefly, each of the air guide plates 3c is connected to the rotor member 2 by rivets 6, rather than by the legs 30 and the rivets 5 as in Embodiment 100.

More specifically, the rotor member 2 further includes a plurality of recessed ledge portions 22 extending from the inner peripheral face of the annular portion 20. Each of the recessed ledge portions 22 is located between the adjacent two of the support limbs 21 of the rotor member 2. The air guide plates 3c are partly attached on the respective recessed ledge portions 22 of the rotor member 2 and secured thereto by the rivets 6, as depicted in FIG. 8.

What is claimed is:

1. A brake disc assembly comprising:
   a hub member for connection to a wheel hub;
   a rotor member including an annular portion and a plurality of support limbs that protrude radially inward from an inner peripheral face of the annular portion and are joined to a periphery of the hub member; and
   a plurality of air guide plates disposed in a circumferential direction about a central axis of the hub member and each substantially interposed in a gap between adjacent two of the support limbs of the rotor member, each of the air guide plates having a first opening and a second opening, each of the air guide plates having a first air deflector and a second air deflector, the first and second air deflectors being alternatively located on opposite sides of each air guide plate, the first and second air deflectors being disposed proximate the respective first and second openings to cause airflow to go around the rotor member, the first and second air deflectors of each of the air guide plates having a curved or angulated directing surface that alters a course of air encountering the directing surface such that all the air deflectors together direct the airflow generally in a circumferential direction, the first air deflector is located on a first side of the opposite sides of the associated air guide plate to cause the airflow to pass through the first opening from a second side of the opposite sides of the air guide plate to the first side, and the second air deflector is located on the second side of the air guide plate proximate the second opening to cause the airflow to pass through the second opening from the first side to the second side.

2. The brake disc assembly as recited in claim 1, wherein one of the air guide plates has its first and second air deflectors located on a first side of the opposite sides thereof; and another one of the air guide plates has its first and second air deflectors located on a second side of the opposite sides thereof.

3. The brake disc assembly as recited in claim 1, wherein the at least one opening of each of the air guide plates includes a first opening, a second opening and a third opening arranged in a row; and; the second opening is sized smaller than the first opening, and the third opening is sized smaller than the second opening; and the at least one air deflector of each of the air guide plates includes a first air deflector, a second air deflector and a third air deflector that are sized corresponding to and located proximate the respective first, second and third openings.

4. The brake disc assembly as recited in claim 1, wherein the hub member also includes a plurality of arm sections extending radially outwardly and being connected to the support limbs of the rotor member.

5. The brake disc assembly as recited in claim 1, further comprising a plurality of fasteners, wherein the hub member includes a plurality of circumferentially spaced holes dimensioned to receive the respective fasteners; each of the support limbs of the rotor member has a hole corresponding to the respective hole in the hub member; and the fasteners pass through the holes in the hub member as well as the holes in the support limbs of the rotor member for connection of the hub member and the rotor member.

6. The brake disc assembly as recited in claim 5, wherein each of the air guide plates has a leg extending in a direction along an associated one of the support limbs of the rotor member and defining a bore corresponding to the hole in the associated support limb; and each of the fasteners passes through the hole in the respective support limb of the rotor member, the bore in the leg of the respective air guide plate as well as the respective hole in the hub member for connection of the hub member, the rotor member and the air guide plates.

7. The brake disc assembly as recited in claim 6, further comprising at least one rivet disposed at a junction between each support limb of the rotor member and the associated air guide plate for laterally positioning the air guide plate within the gap between the adjacent two of the support limbs of the rotor member.

8. The brake disc assembly as recited in claim 1, further comprising a plurality of rivets, wherein the rotor member further includes a plurality of recessed ledge portions extending from the inner peripheral face of the annular portion and each located between the adjacent two of the support limbs of the rotor member; and the guide plates are partly mounted onto the respective recessed ledge portions of the rotor member by the rivets.

9. The brake disc assembly as recited in claim 1, wherein the hub member defines a plurality of circumferentially spaced holes for connection to the wheel hub by bolts.

* * * * *